(12) United States Patent
Ortmann

(10) Patent No.: US 12,163,932 B2
(45) Date of Patent: Dec. 10, 2024

(54) CONFIGURING AN INJECTOR FOR EMULATING OPERATION OF ANOTHER INJECTOR

(71) Applicant: Agilent Technologies, Inc., Santa Clara, CA (US)

(72) Inventor: Thomas Ortmann, Straubenhardt/Ottenhausen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 714 days.

(21) Appl. No.: 17/312,888

(22) PCT Filed: Dec. 14, 2018

(86) PCT No.: PCT/IB2018/060106
§ 371 (c)(1),
(2) Date: Jun. 10, 2021

(87) PCT Pub. No.: WO2020/121049
PCT Pub. Date: Jun. 18, 2020

(65) Prior Publication Data
US 2022/0128519 A1 Apr. 28, 2022

(51) Int. Cl.
*G01N 30/24* (2006.01)
*F16K 11/074* (2006.01)
(Continued)

(52) U.S. Cl.
CPC ............ *G01N 30/24* (2013.01); *F16K 11/074* (2013.01); *G01N 30/06* (2013.01); *G01N 30/18* (2013.01);
(Continued)

(58) Field of Classification Search
CPC ............ F16K 11/074; G01N 2030/027; G01N 30/06; G01N 30/18; G01N 30/20;
(Continued)

(56) References Cited

U.S. PATENT DOCUMENTS

| 5,814,742 A | 9/1998 | Vissers et al. |
| 2012/0096919 A1 | 4/2012 | Choikhet et al. |

(Continued)

FOREIGN PATENT DOCUMENTS

| CN | 102103127 A | 6/2011 |
| CN | 102460145 A | 5/2012 |

(Continued)

OTHER PUBLICATIONS

International Search Report and Written Opinion mailed on Aug. 28, 2019 for Application No. PCT/IB2018/060106; 14 pages.
Chinese Office Action and Search Report dated Jul. 29, 2023, for application No. 201880100237.3; 15 pages.

*Primary Examiner* — Jennifer Wecker
*Assistant Examiner* — Jonathan Bortoli

(57) ABSTRACT

A configurable injector for injecting a fluidic sample in a separation path of a sample separation apparatus includes a sample accommodation volume for accommodating the fluidic sample to be injected into the separation path, a valve arrangement fluidically couplable with the separation path, fluidically coupled with the sample accommodation volume, and being controllable for injecting the fluidic sample into the separation path, an input interface configured for receiving input data indicative of an injection profile of an injector to be emulated by the configurable injector, and a control unit configured for controlling the configurable injector, in particular the valve arrangement, so that the configurable injector is operated in accordance with the injection profile to thereby emulate the injector to be emulated.

17 Claims, 2 Drawing Sheets

(51) Int. Cl.
  *G01N 30/02* (2006.01)
  *G01N 30/06* (2006.01)
  *G01N 30/18* (2006.01)
  *G01N 30/20* (2006.01)
  *G01N 30/22* (2006.01)
  *G01N 30/32* (2006.01)

(52) U.S. Cl.
  CPC ............. *G01N 30/20* (2013.01); *G01N 30/22* (2013.01); *G01N 30/32* (2013.01); *G01N 2030/027* (2013.01); *G01N 2030/201* (2013.01); *G01N 2030/202* (2013.01); *G01N 2030/207* (2013.01); *G01N 2030/324* (2013.01); *G01N 2030/328* (2013.01)

(58) Field of Classification Search
  CPC ........ G01N 30/22; G01N 30/24; G01N 30/32; G01N 2030/201; G01N 2030/202; G01N 2030/207; G01N 2030/324; G01N 2030/328; H01R 39/025; G11B 5/7257; G11B 5/7264; G11B 5/8408
  See application file for complete search history.

(56) References Cited

U.S. PATENT DOCUMENTS

| | | |
|---|---|---|
| 2015/0046134 A1 | 2/2015 | Hallin |
| 2015/0265944 A1 | 9/2015 | Hochgraeber et al. |
| 2016/0327514 A1* | 11/2016 | Shoykhet ............... G01N 30/32 |
| 2017/0219539 A1* | 8/2017 | Wachinger ............. G01N 30/20 |
| 2017/0322187 A1 | 11/2017 | Thielsch et al. |
| 2018/0052141 A1 | 2/2018 | Stoll et al. |
| 2021/0389282 A1* | 12/2021 | Ortmann ................ G01N 30/22 |

FOREIGN PATENT DOCUMENTS

| | | |
|---|---|---|
| CN | 102590399 A | 7/2012 |
| CN | 103261883 A | 8/2013 |
| CN | 103608672 A | 2/2014 |
| CN | 104879532 A | 9/2015 |
| CN | 105308448 A | 2/2016 |
| CN | 107407663 A | 11/2017 |
| CN | 107449851 A | 12/2017 |
| EP | 1577012 A1 | 9/2005 |
| EP | 3252464 A1 | 12/2017 |
| WO | 2011000407 A1 | 1/2011 |
| WO | 2012079907 A2 | 6/2012 |

* cited by examiner

CONFIGURING AN INJECTOR FOR EMULATING OPERATION OF ANOTHER INJECTOR

RELATED APPLICATIONS

This application is the national stage under 35 U.S.C. 371 of International Application No. PCT/IB2018/060106, filed Dec. 14, 2018, the entire contents of which are incorporated by reference herein.

BACKGROUND ART

The present invention relates to an injector, a sample separation apparatus, a method of injecting a fluidic sample in a separation path of a sample separation apparatus, a program element and a computer readable medium.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation.

However, the flexibility of operating conventional injectors is limited.

SUMMARY

It is an object of the invention to provide an injector for a sample separation system with improved flexibility.

According to an exemplary embodiment of the present invention, a configurable injector for injecting a fluidic sample in a separation path (in particular a flow path between a fluid drive unit, such as a high-pressure pump, and a sample separation unit, such as a chromatographic separation column) of a sample separation apparatus is provided, wherein the configurable injector comprises a sample accommodation volume for accommodating the fluidic sample to be injected into the separation path, a valve arrangement fluidically couplable with the separation path, fluidically coupled with the sample accommodation volume, and being controllable for injecting the fluidic sample into the separation path, an input interface configured for receiving input data indicative of an injection profile of an injector to be emulated by the configurable injector, and a control unit configured for controlling the configurable injector, in particular the valve arrangement, so that the configurable injector is operated in accordance with the injection profile to thereby emulate the injector to be emulated.

According to another exemplary embodiment, a sample separation apparatus for separating a fluidic sample is provided, wherein the sample separation apparatus comprises a fluid drive unit configured for driving a mobile phase and the fluidic sample when injected in the mobile phase along a separation path of the sample separation apparatus, a configurable injector having the above-mentioned features and configured for injecting the fluidic sample into the separation path in accordance with a received injection profile to thereby emulate an injector to be emulated, and a separation unit configured for separating the fluidic sample injected in the mobile phase in the separation path.

According to still another exemplary embodiment, a method of injecting a fluidic sample in a separation path of a sample separation apparatus by correspondingly configuring a configurable injector to emulate operation of an injector to be emulated is provided, wherein the configurable injector comprises a sample accommodation volume for accommodating the fluidic sample to be injected into the separation path, and a valve arrangement fluidically coupled with the sample accommodation volume, and being configured for injecting the fluidic sample into the separation path, wherein the method comprises receiving, by the configurable injector, input data indicative of an injection profile of the injector to be emulated, and configuring the configurable injector (in particular the valve arrangement) so that the configured injector is operated in accordance with the injection profile and thereby emulates the injector to be emulated.

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a hard disk) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

In the context of the present application, the term "configurable injector" may particularly denote an injector for a sample separation apparatus for injecting a fluidic sample into a separation path between a fluid drive unit and a separation unit which is provided with the specific capability to emulate another injector's function in accordance with input configuration data. For instance, the configurable injector may be configured to behave in accordance with another injector function defined by a set of parameters and apparatus characteristics of such an injector to be emulated. For this purpose, the configurable injector may have an input interface via which the configurable injector is configurable in accordance with a set of parameters defining the injection profile of the injector to be emulated. The configurable injector may be configured in such a way that it emulates the operation of the injector to be emulated so as to behave as the injector to be emulated when being operated with the parameters corresponding to the input injection profile.

In the context of the present application, the term "injector to be emulated" is an injector (or injector type) between different from the configurable injector (or injector type). Thus, when one and the same sample separation analysis procedure is carried out with the configurable injector on the one hand and the injector to be emulated on the other hand without adapting the configurable injector in accordance with the specific injection profile, the separation result might be different in view of the different operation properties of the configurable injector on the one hand and the injector to be emulated on the other hand. Thus, the operation of the injector to be emulated may be defined by the injection profile which may be input to the input interface of the configurable injector so that the latter behaves as the injector to be emulated.

In the context of the present application, the term "sample separation apparatus" may particularly denote an apparatus which is configured for separating a fluidic sample into different fractions. In particular, the sample separation apparatus may be a chromatography apparatus. When the fluidic sample is applied to the sample separation apparatus and is injected via the configurable injector towards the separation path between fluid drive unit and sample separation unit, different physical, chemical and/or biological properties of different fractions of the fluidic sample may result in a separation of the different fractions.

In the context of the present application, the term "sample accommodation volume" may particularly denote a predefined volume capable of accommodating a predefined amount of fluidic sample, in which a fluidic sample to be subsequently separated may be pushed, drawn or pumped in another way for subsequent injection between fluid drive unit and separation unit of the sample separation apparatus. For instance, the sample accommodation volume may be a sample loop in which the fluidic sample, to be subsequently separated, may be temporarily stored or accommodated.

In the context of the present application, the term "valve arrangement" may particularly denote an arrangement of one or more fluidic valves which can be switched under the control of a control unit so as to provide one or more functions during the sample separation procedure. For instance, such a fluidic valve may comprise a stator having one or more fluidic ports for connection to different fluidic members. Such a fluidic valve may furthermore have one or more fluid conduits in a rotor, wherein the rotor may be selectively rotatable relative to the stator. As a consequence, the one or more fluidic conduits and the one or more fluidic ports can be brought in alignment or out of alignment in different switching states of the fluidic valve so as to enable or disable different fluidic connections by the fluidic valve depending on its switching state.

In the context of the present application, the term "input interface" may particularly denote a data interface via which an entity may input data to the injector to define its operation. This entity may be for instance a machine, for instance a control unit for controlling the injector or even the entire sample separation apparatus. In another embodiment, the entity may be a user capable of inputting data via a user interface.

In the context of the present application, the term "injection profile" may particularly denote a data set or parameter set which defines how the configurable injector is in fact configured to behave like an injector of a certain other type or characteristics. For instance, the injection profile may define whether the configurable injector shall operate in accordance with a feed injection characteristics, a sample loop injection characteristics, etc. The injection profile may therefore include an entire data set sufficient for serving as a command for the configurable injector to behave and operate like another injector.

According an exemplary embodiment of the invention, a sample separation apparatus with a configurable injector is provided which can be configured in a specific way so as to operate not as the configurable injector would normally do, but in contrast to this in accordance with an injection profile of another injector. Thus, this other injector can be emulated by the configurable injector. As a result, one and the same configurable injector can be configured and thus operated to substitute multiple different injectors, which can all be emulated by the configurable injector. In other words, the configurable injector may be configured so as to be capable of supporting operability of one or more other injectors or injector types by the mere configuration of its operation parameters set which may be input via the input interface. Thus, a multipurpose injector may be provided which can be programmed in such a way that its behaviour is different from its intrinsic behaviour but is specifically adaptable to behave like another injector, by a mere configuration in accordance with the injection profile supplied via the input interface. Thus, it may be sufficient to provide a single injector which may be operated in different operation modes so as to behave, in terms of its contribution to the sample separation process, as different types of injectors would do. As a consequence, a sample separation apparatus with high performance and high flexibility can be provided which can be adjusted so as to meet any user-defined requirements of injector operation. For instance, the configurable injector may be a feed injection type injector which may be configurable to selectively behave, in one configuration state, as a feed injection type injector to be emulated or, in another configuration state, as a sample loop injection type injector to be emulated.

In the following, further embodiments of the injector, the sample separation apparatus, the method, the program element and the computer readable medium will be explained.

In an embodiment, the configurable injector comprises a metering device being controlled, controllable or configured to be controlled by the control unit for driving the fluidic sample into and/or out of the sample accommodation volume so that the configurable injector is operated in accordance with the injection profile to thereby emulate the injector to be emulated. For instance, the metering device may comprise a piston pump or a syringe pump. The metering device may be configured for withdrawing a piston for drawing fluidic sample into the sample accommodation volume. The piston may be moved forwardly for injecting the drawn fluidic sample into the separation path. Switching of the valve arrangement and operation of the metering device may be synchronized or coordinated by the control unit.

In an embodiment, the control unit is configured for controlling the configurable injector in accordance with the injection profile to selectively emulate the injector to be emulated operating in accordance with feed injection or in accordance with sample loop injection, depending on the input data received via the input interface. In other words, the configurable injector may be configured to support both, feed injection and sample loop injection.

In the context of the present application, the term "feed injection" may particularly denote an injection mechanism of injecting a fluidic sample in the separation path between a fluid drive unit driving a mobile phase and a separation unit separating the fluidic sample by combining a flow of fluidic sample with another flow of mobile phase at a fluidic connection point (such as a fluidic T-piece, a fluidic Y-piece, a fluidic X-piece) which may be located inside of the valve arrangement or outside of the valve arrangement. Thus, two previously separate flows of mobile phase and fluidic sample may be combined at a three (or more) path junction (having at least two inlet flow paths and one common outlet flow path) so as to flow together towards a sample separation unit. Feed injection technology may provide a (preferably pre-pressurized) sample that is injected into the mobile phase stream upstream of the separation unit (such as a chromatographic column) by a syringing process.

In the context of the present application, the term "sample loop injection" may particularly denote an injection mechanism of injecting a fluidic sample in the separation path between a fluid drive unit driving a mobile phase and a separation unit separating the fluidic sample by firstly accommodating a fluidic sample in a sample accommodation volume being fluidically decoupled from the separation path (between a fluid drive unit for driving a mobile phase and a separation unit for separating the fluidic sample). Subsequently, the valve arrangement may be switched so that the sample accommodation volume with the pre-filled fluidic sample is switched (with or without prepressurizing the fluidic sample) into the separation path between fluid drive unit and separation unit. In terms of sample loop injection, the sample loop (or other kind of sample accommodation volume) forms part of the separation path during injection.

According to the described embodiment, the configurable injector may be capable of being operated both according to feed injection as well as according to sample loop injection, depending on input data provided at the input interface. The decision as to whether the configurable injector presently emulates a feed injection type injector or a sample loop injection type injector can thus be taken by supplying corresponding input data to define the injection profile. In particular, it is possible that the configurable injector is constructed, in terms of hardware, as a feed injection type injector, but is configurable by the input data to behave and operate as a sample loop injection type injector would behave and operate.

In an embodiment, the valve arrangement and the metering device are configured for injecting the fluidic sample into the separation path by combining, at a fluidic connection point, the fluidic sample flowing along a sample flow path from the sample accommodation volume with a mobile phase flowing in the separation path, being separate from the sample flow path, of the sample separation apparatus. Thus, the configurable injector may of a feed injection type in which flowing fluid streams of a mobile phase on the one hand and the fluidic sample coming from the sample accommodation volume on the other hand are combined at a fluidic coupling point (such as a fluidic T-piece, a fluidic Y-piece, etc., and which may be implemented in an interior of the valve arrangement).

Still referring to the previously described embodiment, the control unit may be configured for controlling the valve arrangement and the metering device in another operation mode to emulate another injector to be emulated injecting fluidic sample by switching a sample filled sample accommodation volume into a separation path. Thus, the previously mentioned configurable injector being operated in the feed injection mode can also be operated to emulate a sample loop injection type injector by correspondingly adapting its operation.

When implementing the configurable injector as a feed injection type injector, it is possible to emulate any kind of injector, because a delay of the beginning of a gradient phase resulting from switching the sample accommodation volume into the separation path in a sample loop injection type injector is not present in a feed injection type injector. In other words, artificially delaying a gradient profile in a feed injection type injector may result in an operation as a sample loop injection type injector. To maximize flexibility of using the configurable injector for any desired injector type, it is therefore advantageous to construct the hardware of the configurable injector in accordance with a feed injection type injector. Alternatively, the configurable injector may be constructed, in terms of hardware, as a sample loop injection injector.

In an embodiment, the control unit is configured for, and the method may comprise, respectively, comparing characteristics of the configurable injector with characteristics of the injector to be emulated in accordance with the injection profile. Thereafter, operation of the configurable injector may be adjusted so that the adjusted operation of the configurable injector is compliant with the injection profile. In other words, in addition to the provision of the injection profile, operation of the configurable injector may furthermore comprise a comparison of the characteristics of the own injector type with the characteristics of the injector to be emulated. An adaptation of the functionality of the configurable injector can then be accomplished so that the configurable injector behaves, in terms of sample injection during sample separation, as the injector to be emulated.

In an embodiment, the control unit is configured for, and the method may comprise, respectively, emulating the injector to be emulated by configuring the configurable injector so that a separation result (in particular a chromatogram) obtained when operating the sample separation apparatus with the configured injector is identical to a separation result (in particular a chromatogram) obtained when operating the sample separation apparatus with the injector to be emulated. When different injectors use the same fluidic sample for separation, the result in an obtained chromatogram may be nevertheless different. This may be due to effects of a delay of a gradient run of a sample loop injection type injector, and other injector intrinsic effects. In order to make chromatograms—or more generally separation results—better comparable, it may for instance be desirable to have an injector providing a chromatogram as if the injector was replaced by an injector to be emulated. Therefore, the manipulation of the operation of the configurable injector in comparison with its intrinsic behaviour so as to emulate another injector may at least partially compensate such effects.

In an embodiment, the control unit is configured for, and the method may comprise, respectively, emulating the injector to be emulated by configuring the configurable injector so that the configurable injector emulates a switching of a sample accommodation volume accommodating fluidic sample into the separation path in accordance with the injection profile. An injector which injects fluidic sample into a separation path between a fluid drive unit and a separation unit by switching a sample accommodation volume (being previously pressure decoupled from the separation path) into the separation path may also be denoted as an injector operating in accordance with sample loop injection. Thus, the emulation functionality of the configurable injector may be of such kind that a feed injection type injector is operated, in accordance with the injection profile, to behave like a sample loop injection type injector. The embodiments described in the following four paragraphs may correspond to such a sample loop injection configuration of the injector to be emulated.

In an embodiment, the control unit is configured for, and the method may comprise, respectively, emulating the injector to be emulated by configuring the configurable injector to emulate injection using a sample accommodation volume without a needle-seat arrangement. In such a so-called fixed loop injection mode, an injector may operate only with a sample accommodation volume (such as a sample loop), however without needle and seat. In such an embodiment, a sample accommodation volume filled (in particular completely) with fluidic sample may be switched into the separation path.

In another embodiment, the control unit is configured for, and the method may comprise, respectively, emulating the injector to be emulated by configuring the configurable injector to emulate injection using a sample accommodation volume in combination with a needle-seat arrangement, but without a metering device. Such an injector type may be denoted as flow-through needle injector. No metering device, but a sample accommodation volume (such as a sample loop), and a needle and a seat configuration may be present in such an embodiment.

In still another embodiment, the control unit is configured for, and the method may comprise, respectively, emulating the injector to be emulated by configuring the configurable injector to emulate injection using a sample accommodation volume in combination with a needle-seat arrangement and a metering device. In such a flow-through configuration, a metering device cooperates with a sample accommodation volume (such as a sample loop) and a needle and seat configuration. For drawing fluidic sample from a sample container into the sample accommodation volume, the needle may be driven out of the seat and may be immersed in the fluidic sample in the sample container. A piston of the metering device may then drive in a backward direction so as to aspirate fluidic sample into the sample accommodation volume. Further, subsequently, the needle may be driven back into the seat, and the fluidic sample may be injected from the sample accommodation volume into the separation path. Also such a procedure can be emulated by the injector by correspondingly operating its components, even when the configurable injector is intrinsically (or in terms of its hardware) of a feed injection type.

In yet another embodiment, the control unit is configured for, and the method may comprise, respectively, emulating the injector to be emulated by configuring the configurable injector to emulate injection of fluidic sample only filling part of the sample accommodation volume. In such a partial loop fill configuration, a fixed loop injection architecture may be implemented, however with the difference that the sample accommodation volume (such as a sample loop) may be only partially filled with fluidic sample prior to injection.

In an embodiment, the control unit is configured for, and the method may comprise, respectively, emulating the injector to be emulated by configuring the configurable injector so that a flow rate dip, occurring when operating the injector to be emulated, is emulated by the configurable injector. When fluidic sample in a sample accommodation volume is introduced into the separation path by switching the sample accommodation volume—previously outside of the separation path—into the separation path, the pressure difference between the separation path (usually at system pressure, for instance 1200 bar) and the pressure of the sample accommodation volume (for instance ambient pressure), may result in a sudden pressure shock, which may generate undesired discontinuities in the flow rate. By correspondingly imposing a pressure profile by the configurable injector (for instance a feed injection type injector from a hardware point of view) such a flow rate dip may be simulated or emulated. As a result, an obtained chromatogram may look as if the configurable injector was a sample loop injection type injector to be emulated with flow rate dip due to pressure artefacts.

In an embodiment, the control unit is configured for, and the method may comprise, respectively, emulating the injector to be emulated by configuring the configurable injector to emulate injection of the fluidic sample in the separation path with a pre-compression of the fluidic sample in the sample accommodation volume prior to injecting the fluidic sample into the separation path. Still referring to the previously described embodiment, the mentioned flow rate dip may be reduced or even eliminated when the sample accommodation volume loaded with the fluidic sample is brought to an elevated pressure (preferably up to system pressure) prior to injecting the fluidic sample into the separation path. For this purpose, a pre-compression may occur, for instance accomplished by the metering device. Corresponding influences of such a chromatographic method on the chromatogram may be taken into account when configuring the configurable injector to behave like the injector to be emulated with pre-compression functionality.

In an embodiment, the control unit is configured for, and the method may comprise, respectively, emulating the injector to be emulated by configuring the configurable injector to emulate injection of the fluidic sample in the separation path without a pre-compression of the fluidic sample in the sample accommodation volume prior to injecting the fluidic sample into the separation path. When no pre-compression is accomplished in the operation of the injector to be emulated, i.e. in the injector in accordance with the input injection profile, a corresponding behaviour of the injector may be replicated or reproduced.

In an embodiment, the control unit is configured for, and the method may comprise, respectively, emulating the injector to be emulated by configuring the configurable injector to operate so that a gradient profile of mobile phase is emulated in accordance with the injection profile. For instance, the control unit is configured for, and the method may comprise, respectively, emulating the injector to be emulated by configuring the configurable injector to delay start of a gradient run in accordance with a gradient delay characteristic of the injector to be emulated. In case of an injector of the sample loop injection type, the start of a gradient run during which a solvent composition is gradually changed for releasing separated fractions of a fluidic sample from a separation unit in accordance with the principle of chromatography, start of the gradient may be temporarily delayed as compared to a trigger signal for starting the gradient profile. This is an intrinsic property of sample loop injection type injector. However, when the configurable injector emulates another injector with such a sample loop injector architecture, the delay of the start of the gradient can be simulated or artificially added so as to make the configurable injector appear as the injector to be emulated.

In an embodiment, the control unit is configured for, and the method may comprise, respectively, emulating the injector to be emulated by configuring the configurable injector to dilute fluidic sample with a diluent in accordance with the injection profile. Even if, due to the intrinsic properties of the configurable injector, no sample dilution is foreseen, such a feature may be implemented by correspondingly modifying operation of the configurable injector to provide also sample dilution before injection. By taking this measure, also chromatographic methods introducing sample dilution prior to separation may be mimicked.

In an embodiment, the control is configured for, and the method may comprise, respectively, emulating the injector to be emulated by configuring the configurable injector so that an interior volume of the injector to be emulated is added prior to starting a separation run, in particular a gradient run, by the configurable injector. Some injectors (to be emulated) may have a dead volume resulting from their intrinsic constructions. Although such a dead volume may be a disturbing effect, it may have an influence on the separation result. For improving comparability between different chromatograms obtained with different injector types, one of which suffering from an interior dead volume, even the configurable injector can, emulating another injector with such an interior volume, be operated so as if there was an interior dead volume in the configurable injector as well.

In an embodiment, the control unit is configured for, and the method may comprise, respectively, emulating the injector to be emulated by configuring the configurable injector to inject the fluidic sample into the separation path with a velocity characteristic in accordance with the injection profile. An injector to be emulated may have a certain velocity profile of the fluids (in particular fluidic sample and mobile phase) flowing in an interior thereof. Such a velocity profile may be influenced by the inner diameter of the conduits and the ports of the injector. Depending on the diameter of a conduit, also a Poisson profile (i.e. a substantially parabolic velocity profile) may be established. All these effects may be simulated or emulated by the configurable injector, i.e. by a corresponding configuration thereof.

In an embodiment, the control unit is configured for, and the method may comprise, respectively, emulating the injector to be emulated by configuring the configurable injector to adjust a volume of the injected fluidic sample for compensating a leakage characteristic of the injector to be emulated. In a scenario, in which an injector to be emulated suffers from a certain leakage characteristic, with the result that fluidic sample is lost during the separation process, such a loss of fluidic sample may be simulated by (an even leakage-free) configurable injector as well. For instance, a correspondingly reduced amount of fluidic sample may be injected to emulate the loss of fluidic sample due to leakage in the injector to be emulated, or part of the fluidic sample may be drained before separation.

In an embodiment, the control unit is configured for, and the method may comprise, respectively, emulating the injector to be emulated by configuring the configurable injector to operate in accordance with a flow rate characteristic of the injector to be emulated. Thus, flow rates of fluidic sample and mobile phase may be adjusted (at a certain pressure) so that the corresponding behaviour of the configured configurable injector corresponds to the expected behaviour of the injector to be emulated, as defined by its injection profile.

In an embodiment, the control unit is configured for, and the method may comprise, respectively, emulating the injector to be emulated by configuring the configurable injector to provide a mobile phase composition in accordance with the injection profile. Hence, the time dependence of solvent composition of the mobile phase (for instance composed of water and an organic solvent, such as methanol or acetonitrile) may be adjusted by operating the configurable injector in accordance with a correspondingly defined injection profile.

In an embodiment, an injector for injecting the fluidic sample to be separated into the defined mobile phase provided by the fluid supply system comprises a needle and a seat configured for accommodating the needle, wherein the needle is drivable towards a sample container for intaking fluidic sample into the sample accommodation volume by the sample drive, and wherein the needle is configured to be drivable to the seat prior to injection. In such a configuration, the fluidic sample may be stored in the sample container (such as a vial). The needle may be driven out of the seat, for instance by a robot, and may be immersed into the fluidic sample in the sample container. Subsequently, a piston of the sample drive (such as a metering pump) may be driven in a backward direction to thereby intake a certain amount of fluidic sample from the sample container via the needle into the fluid accommodation volume. Thereafter, the needle may be driven back into the seat to establish a fluid-tight connection there. By switching the valve arrangement into an injection state, the intaken fluidic sample may be injected from the sample accommodation volume towards the separation unit.

In an embodiment, a sample drive or metering device of an injector comprises a piston configured for moving in opposite directions when intaking fluidic sample (which may involve a backward motion of the piston) and when injecting fluidic sample into the separation path pressing the fluidic sample towards the separation unit in the injection switching state. The piston may be mounted for reciprocating in a piston chamber of the sample drive. For drawing or intaking fluidic sample into the sample accommodation volume, the piston may be moved backwardly so as to draw fluidic sample from a sample container through a needle into the sample accommodation volume.

Embodiments of the above described valve arrangement may be implemented in conventionally available HPLC systems, such as the Agilent 1200 Series Rapid Resolution LC system or the Agilent 1150 HPLC series (both provided by the applicant Agilent Technologies—see the website www.agilent.com.

One embodiment of a sample separation device, in which one or more of the above described fluidic valves may be implemented, comprises a pumping apparatus as fluid drive or mobile phase drive having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties, which may be used to represent or retrieve actual properties of fluidic content, which is anticipated to be in a sampling apparatus.

The separation unit of the sample separation apparatus preferably comprises a chromatographic column (see for instance the webpage en.wikipedia.org/wiki/Column_chromatography) providing the stationary phase. The column may be a glass or steel tube (for instance with a diameter from 50 µm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under the website www.agilent.com.

Embodiments of the invention can be partly or entirely embodied or supported by one or more suitable software programs (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) can be preferably applied in or by the control unit. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
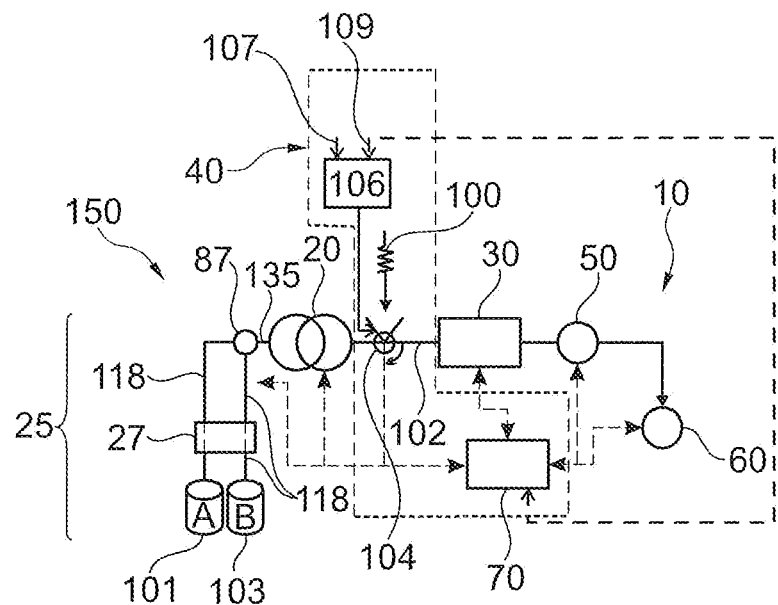
FIG. 1 shows a sample separation apparatus in accordance with embodiments of the present invention, particularly used in high performance liquid chromatography (HPLC).

The illustration in the drawing is schematic.

DETAILED DESCRIPTION

Before describing the figures in further detail, some basic considerations of the present invention will be summarized based on which exemplary embodiments have been developed.

A separation result (a chromatogram in case of chromatography) is defined by a combination of the characteristics of the fluidic sample to be separated, a separation method (in particular a chromatographic method) executed, and device characteristics of the sample separation apparatus (in particular a chromatography apparatus). Part of the sample separation apparatus is an injector which has the function to aspirate a fluidic sample from a sample container and to subsequently inject the aspirated fluidic sample into the separation path of the sample separation apparatus. Each injector has its own influence on the separation result.

According to an exemplary embodiment of the invention, an injector of a sample separation apparatus is configured via an input interface by providing a data set defining the injection profile of another injector which can therefore be emulated or mimicked. Consequently, the configurable injector is subsequently configured in accordance with the input injection profile so that the configured configurable injector behaves as another injector to be emulated would behave if it were implemented in the sample separation apparatus. Therefore, a separation result (such as a chromatogram) may be obtained as if the sample separation apparatus contained the emulated injector. This may enable better comparison of separation results of different sample separation apparatuses, or more precisely of different injectors. In particular, the emulation of the configurable injector may be carried out so that it is not possible to conclude or deduce the type of injection as a result of the emulation. When providing a sample separation apparatus with the described emulation function, it may be sufficient to use and maintain only a single sample separation apparatus (such as a single HPLC) or a single injector and to adapt this single sample separation apparatus or single injector to other chromatographic methods, injection hardware, injection software, etc., without the loss of the opportunity to obtain directly comparable separation results.

According to an exemplary embodiment of the invention, a configurable injector or sampler is provided which is configured for emulating any other injector or sampler. This may be accomplished in particular by providing a feed injection type injector which is adapted in accordance with an injection profile of an injector or a sampler to be emulated. More specifically, exemplary embodiments of the invention are related to a software, a sampler and a pump combination which is able to emulate any other sampler or injector.

For instance, a sampler or injector without any dead volume adding to the main path is able to behave as any other sampler by shifting the start of the gradient to a time representing this sampler volume divided by an actual flow rate.

An advantage of a configurable injector according to an exemplary embodiment of the invention is that it may involve substantially no dead volume. Advantageously, a metering device, a loop, a needle and a seat may be purgeable by a flushing device (for instance an installed flush pump with one or more, in particular three, solvents). Preferably, a pre-compression feature may be provided by the configurable injector, in particular for a feed injection architecture.

An embodiment may provide a hydraulic junction with the capability to compress and/or decompress a loop, a needle, and/or a seat with the metering device before and/or after switching into or out of the flow path. Furthermore, the metering device may be self-purgeable with fresh solvent which can be provided by a solvent selection valve or a solvent container. In addition, quenching solvent can be dispensed via a metering device to control the reactor fluid.

Advantageously, exemplary embodiments of the invention may be installable in existing samplers or injectors. A metering device of the injector may be purgeable. Advantageously, an injector or a sampler can be provided which can mime every other sampler by adapting its injection behavior correspondingly, in particular by changing dead volume and injection behavior. This can be done, for instance, by adding dead volume as a loop and/or by shifting gradient. In such an embodiment, a user will only need one injector or sampler to be method compatible with all of its already existing methods. This may also result in saved bench space, because one stack of modules of a sample separation apparatus may be sufficient, instead of many to have certain diversity.

In order to exclude the needle, seat, loop and metering device from the main path of the reactor fluid path this setup can be used. The sample may be taken by plunger movement of the metering device. The sample draw speed may be adjustable and can be set as method parameter. Highly advantageously, exemplary embodiments of the invention may be operated with only marginal pressure fluctuations (depending on injection mode), in particular when a sample path pre-compression is implemented. Furthermore, a low carryover can be obtained when a purge mode is implemented in which also the needle can be lifted to clean a needle-seat interface (in particular with solvent pumped from flush pump device). In another exemplary embodiment of the invention, a draw volume may be selectable—in particular not limited, selectable in a range of maximum volume of the loop installed. Exemplary embodiments of the invention may also keep the pressure stable, for instance up to 1300 bar or more.

Referring now in greater detail to the drawings, FIG. 1 depicts a general schematic of a liquid separation system as example for a sample separation device 10 according to an exemplary embodiment of the invention. A pump as fluid drive unit 20 receives a mobile phase from a solvent supply 25, typically via a degasser 27, which degases and thus reduces the amount of dissolved gases in the mobile phase. The mobile phase drive or fluid drive unit 20 drives the mobile phase through a separation unit 30 (such as a chromatographic column) comprising a stationary phase. A sampler or injector 40, implementing a fluidic valve or valve arrangement 104, can be provided between the fluid drive unit 20 and the separation unit 30 in order to subject or add (often referred to as sample introduction) a sample fluid into the mobile phase. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive unit 20, so that the fluid drive unit 20 already receives and pumps the mixed solvents as the mobile phase. Alternatively, the fluid drive unit 20 might be comprised of plural individual pumping units, with plural of the pumping units each receiving and pumping a different solvent or mixture, so that the mixing of the mobile phase (as received by the separation unit 30) occurs at high pressure and downstream of the fluid drive unit 20 (or as part thereof). The composition (mixture) of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation device 10 in order to receive information and/or control operation. For example, the control unit 70 may control operation of the fluid drive unit 20 (for example setting control parameters) and receive therefrom information regarding the actual working conditions (such as output pressure, etc. at an outlet of the pump 20). The control unit 70 may also control operation of the solvent supply 25 (for example setting the solvent/s or solvent mixture to be supplied) and/or the degasser 27 (for example setting control parameters such as vacuum level) and might receive therefrom information regarding the actual working conditions (such as solvent composition supplied over time, vacuum level, etc.). The control unit 70 might further control operation of the sampling unit or injector 40 (for example controlling sample injection or synchronization of sample injection with operating conditions of the fluid drive unit 20). The separation unit 30 might also be controlled by the control unit 70 (for example selecting a specific flow path or column, setting operation temperature, etc.), and send—in return—information (for example operating conditions) to the control unit 70. Accordingly, the detector 50 might be controlled by the control unit 70 (for example with respect to spectral or wavelength settings, setting time constants, start/stop data acquisition), and send information (for example about the detected sample compounds) to the control unit 70. The control unit 70 might also control operation of the fractionating unit 60 (for example in conjunction with data received from the detector 50) and provide data back.

FIG. 1 also shows a liquid supply system 150 configured for metering liquids in controlled proportions and for supplying a resultant mixture. The liquid supply system 150 comprises (in the shown embodiment) two reservoirs 101, 103, with each of the reservoirs 101, 103 containing a respective solvent A (in this example water), B (in this example a buffer, i.e. salt dissolved in a solvent). Moreover, it is possible to provide one or more additional reservoirs, for instance an additional reservoir comprising an organic solvent, a further reservoir comprising an optional organic modifier, etc. Each of the reservoirs 101, 103 is fluidically connected via a respective liquid supply line 118 with a proportioning unit 87 which may be configured as proportioning valve. The proportioning unit 87 is configured to connect a selected one of the liquid supply lines 118 with a supply line 135, and to switch between different liquid supply lines 118. The supply line 135 is connected with an inlet of the fluid drive unit 20. Hence, solvent blending may be performed at the low-pressure side of the fluid drive unit 20 by metering or proportioning a sequence of fluidic portions.

Highly advantageously, the injector 40 is embodied as a configurable injector 40 for injecting a fluidic sample in a separation path 102 between fluid drive unit 20 and separation unit 30, i.e. as an injector 40 which can be reconfigured to execute or mimic another injection scheme. As shown in FIG. 1, the injector 40 comprises a sample accommodation volume 100, such as a sample loop, for accommodating the fluidic sample to be subsequently injected into the separation path 102. Moreover, the valve arrangement 104 of the configurable injector 40 is fluidically coupled with the separation path 102, fluidically coupled with the sample accommodation volume 100, and controllable for injecting the fluidic sample into the separation path 102.

Furthermore, an input interface 106 of the injector 40 is foreseen and configured for receiving input data indicative of an injection profile of an injector to be emulated (see for instance the injector 108 of FIG. 3 to FIG. 6 which has injection characteristics that can be emulated or mimicked by the configurable injector 40). The above-mentioned control unit 70, which may at least partially form part of the injector 40, may be configured for controlling in particular the valve arrangement 104 so that the configurable injector 40 is operated in accordance with the injection profile to thereby emulate the injector to be emulated 108. The valve arrangement 104 is configured for injecting the fluidic sample into the separation path 102 of the sample separation apparatus 10 to thereby combine the fluidic sample from the sample accommodation volume 100 and a mobile phase (flowing along the separation path 102 between fluid drive unit 20 and separation unit 30). The control unit 70, in turn, may be configured for comparing characteristics of the configurable injector 40 with characteristics of the injector to be emulated 108 in accordance with the injection profile and is configured for adjusting operation of the configurable injector 40 so that the adjusted operation of the configurable injector 40 is compliant with the injection profile. In other words, the correspondingly configured injector 40 will behave like the injector to be emulated 108, as defined by the injection profile input via the input interface 106.

As can be taken from FIG. 1, the input interface 106 is configured as a data input for receiving input data being indicative of the injection profile to be presently emulated. Such data may be input by a user via a first input interface 107 and/or by the control unit 70 (or any other automatic controller or apparatus) via a second input interface 109. For instance, the first input interface 107 may be an I/O unit which may comprise an input element such as a touchscreen or a keypad and an output element such as a display via which a user can operate the configurable injector 40. The input injection profile may provide all information necessary for the injector 40 to carry out the injection in accordance with a characteristic which does not necessarily correspond to the intrinsic function of the injector 40, but makes the injector 40 and consequently the entire sample separation apparatus 10 work like an injector to be emulated (for instance the injector 108 shown in FIG. 3 to FIG. 6) and like a corresponding other sample separation apparatus. After having obtained this information, the injector 40, the control unit 70, or any other processing resource may calculate how a chromatographic separation run has to be configured so that the injector 40 emulates the other injector 108 with the injection profile to be emulated. A fluidic sample which can be accommodated in the sample accommodation volume 100 may then be injected in the separation path 102 so as to be driven by the fluid drive unit 20, separated by the separation unit 30 and detected by the detector 50.

Figure 2:
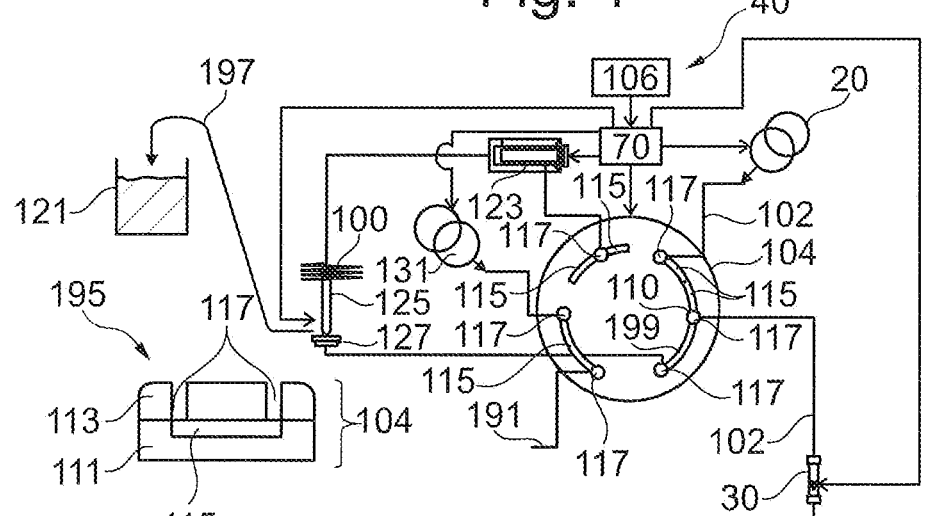
FIG. 2 illustrates a configurable injector according to an exemplary embodiment of the invention.
Figure 3:
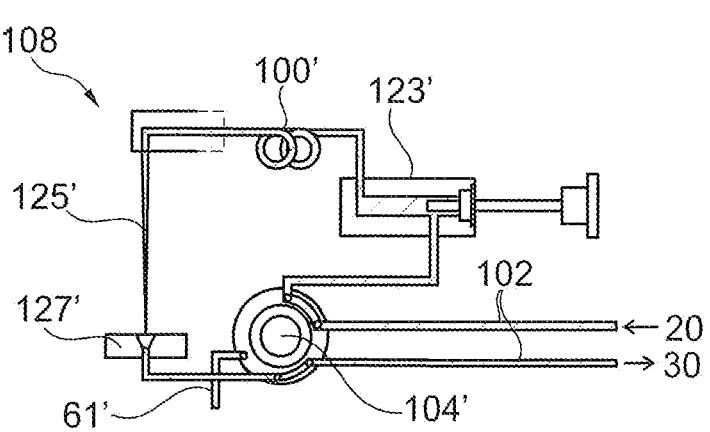
FIG. 3 illustrates an operation state of an injector to be emulated by the injector of FIG. 2 according to an exemplary embodiment of the invention.

FIG. 2 illustrates a configurable injector 40 according to an exemplary embodiment of the invention in a feed inject position.

The sample separation apparatus 10 corresponding to the configurable injector 40 of FIG. 2 comprises a high pressure pump as fluid drive unit 20 driving a mobile phase along a separation path 102. In a corresponding switching state of the valve arrangement 104, the fluid drive unit 20 drives the mobile phase through the valve arrangement 104 and towards the separation unit 30. Such an operation state is shown in FIG. 2.

A metering device 123 (such as a syringe pump) cooperates with the valve arrangement 104, with the sample accommodation volume 100 (here embodied as sample loop), with a needle 125 and with a seat 127. In the configuration according to FIG. 2, the needle 125 is located in a fluid-tight way in the seat 127. However, in order to aspirate sample into the sample accommodation volume 100, the needle 125 may be driven out of the seat 127 (compare reference numeral 197) and may be immersed in a liquid sample in a sample container 121. The piston of the metering device 123 may then move backwardly so as to aspirate sample from the sample container 121 via the needle 125 into the sample accommodation volume 100.

Thereafter, the needle 125 may be driven back (for instance by a robot) into the seat 127 so as to establish again a fluid-tight connection.

The fluidic sample in the sample accommodation volume 100 may then be injected into the separation path 102 between the fluid drive unit 20 and the separation unit 30 at fluidic connection point 110. In accordance with a feed injection architecture, no sudden switching of the sample accommodation volume 100 into the separation path 102 is performed in such an embodiment. In contrast to this, the fluid stream of mobile phase from fluid drive unit 20 to separation unit 30 may be combined at the fluidic connection point 110 with the separate flow of the fluidic sample which is driven by a forward movement of the piston of the metering device 123 from sample accommodation volume 100 via needle 125, seat 127 and valve arrangement 104 including sample flow path 199 towards the fluidic connection point 110 and from there into the separation path 102 towards separation unit 30. In other words, a first flow of mobile phase flows towards fluidic connection point 110 via a mobile phase flow path. A second flow of fluidic sample flows separately from sample accommodation volume 100 via sample flow path 199 towards the fluidic connection point 110. At the fluidic connection point 110, the first flow and the second flow are combined so as to flow as a common stream to separation unit 30. Thus, two input flow paths and one output flow path meet at the three-conduit junction in form of the fluidic connection point 110. The valve arrangement 104 and the metering device 123 are thus configured for injecting the fluidic sample into the separation path 102 by combining, at fluidic connection point 110, the fluidic sample flowing along sample flow path 199 from the sample accommodation volume 100 with a mobile phase flowing in the separation path 102, being separate from the sample flow path 199, of the sample separation apparatus 10.

As shown in FIG. 2 as well, a flush pump 131 may be foreseen as well which may, in a corresponding switching state of the valve arrangement 104, flush conduits of the sample separation apparatus 10 according to FIG. 2. Fluid used for flushing or purging may be drained to via a waste line 191 connected to valve arrangement 104.

FIG. 2 shows that the configurable injector 40 can be implemented with a single fluidic valve as valve arrangement 104. Alternatively, it is however possible that the valve arrangement 104 is composed of multiple fluidic valves. As taken from a cross-sectional view 195 of the valve arrangement 104 in FIG. 2, the valve arrangement 104 comprises a stator 113 with fluidic ports 117 to be connected to the various components of the sample separation device 10 of FIG. 2. Furthermore, the valve arrangement 104 comprises a rotor 111 which is rotatable relative to the stator 113 and comprises one or more fluid conduits 115 which can be brought in fluid alignment or out of fluid alignment with respective ones of the ports 117 so as to establish different fluid connection states.

When, via the input interface 106, information (such as a parameter set) defining a desired operation of an injector 108 to be emulated is obtained, this information may be supplied to control unit 70. The control unit 70 may calculate an impact of the requested emulation characteristics on the functionality of the injector 40. As a result, the various components of the injector 40 (in particular the valve arrangement 104, the metering device 123, the needle 125, the seat 127 and the robot operating the needle 125, as well as further constituents such as the fluid drive unit 20) may be adjusted so that the emulation of the injector 108 to be emulated can be accomplished by the correspondingly configured injector 40.

Various options are possible with the configurable injector 40: For instance, the control unit 70 may be configured for emulating the injector to be emulated 108 by configuring the configurable injector 40 so that a chromatogram obtained when operating the sample separation apparatus 10 with the configured injector 40 is identical to a chromatogram obtained when operating the sample separation apparatus 10 with the injector to be emulated 108. Additionally or alternatively, the control unit 70 may be configured for emulating the injector to be emulated 108 by configuring the configurable injector 40 so that the configurable injector 40 emulates a switching of a sample accommodation volume 100 accommodating fluidic sample into the separation path 102 in accordance with the injection profile. For instance, the shown feed injection type injector 40 may be operated so as to behave as a sample loop injection type injector 108, as defined by the input injection profile. Furthermore, the control unit 70 is configured for emulating the injector to be emulated 108 by configuring the configurable injector 40 to emulate injection using a sample accommodation volume 100 without a needle-seat arrangement, with a sample accommodation volume 100 in combination with a needle-seat arrangement 125, 127 but without a metering device, or with a sample accommodation volume 100 in combination with a needle-seat arrangement 125, 127 and a metering device 123. Apart from this, the control unit 70 may be configured for emulating the injector to be emulated 108 by configuring the configurable injector 40 to emulate injection of fluidic sample only filling part of the sample accommodation volume 100, or filling the entire sample accommodation volume 100. It is also possible that the control unit 70 is configured for emulating the injector to be emulated 108 by configuring the configurable injector 40 so that a flow rate dip (which may in particular occur when operating the injector to be emulated 108 in accordance with a sample loop injection architecture) is emulated by the configurable injector 40. The control unit 70 may be further configured for emulating the injector to be emulated 108 by configuring the configurable injector 40 to emulate injection of the fluidic sample in the separation path 102 with or without a pre-compression of the fluidic sample in the sample accommodation volume 100 prior to injecting the fluidic sample into the separation path 102. When the sample separation device 10 is a liquid chromatography device, the control unit 70 is configured for emulating the injector to be emulated 108 by configuring the configurable injector 40 to operate so that a gradient profile of mobile phase is emulated in accordance with the injection profile, for instance taking into account a delay before a gradient run starts. In particular, the control unit 70 can be configured for emulating the injector to be emulated 108 by configuring the configurable injector 40 so that an interior volume of the injector to be emulated 108 is added prior to starting a gradient run by the configurable injector 40. In yet another embodiment, the control unit 70 may be configured for emulating the injector to be emulated 108 by configuring the configurable injector 40 to dilute fluidic sample with a diluent in accordance with the injection profile. Furthermore, the control unit 70 may be configured for emulating the injector to be emulated 108 by configuring the configurable injector 40 to inject the fluidic sample into the separation path 102 with a velocity characteristic defined or indicated by the input injection profile. Beyond this, the control unit 70 may be configured for emulating the injector to be emulated 108 by configuring the configurable injector 40 to adjust a volume of the injected fluidic sample for compensating a leakage characteristic of the injector to be emulated 108. In other words, even if the configurable injector 40 does not suffer from leakage, leakage of the injector to be emulated 108 may be mimicked by supplying a correspondingly reduced amount of fluidic sample or by intentionally draining part of the fluidic sample in accordance with the leakage characteristic of the injector to be emulated 108. Advantageously, the control unit 70 may be configured for emulating the injector to be emulated 108 by configuring the configurable injector 40 to operate in accordance with a flow rate characteristic of the injector to be emulated 108. It is also possible that the control unit 70 is configured for emulating the injector to be emulated 108 by configuring the configurable injector 40 to provide a (in particular modified) mobile phase composition in accordance with the injection profile. shown. The injector to be emulated 108 comprises a metering device 123' (having a piston which can reciprocate), a sample loop 100', a needle 125', a needle seat 127', and an injection valve 104'. The injection valve 104' is connected between a fluid drive unit 20' and a sample separation unit 30'. Moreover, a waste line 61' is shown as well. A fluid drive unit 20 and a separation unit 30 of a sample separation apparatus 10 may be connected to the injection valve 104' and define separation path 102.

Figure 4:
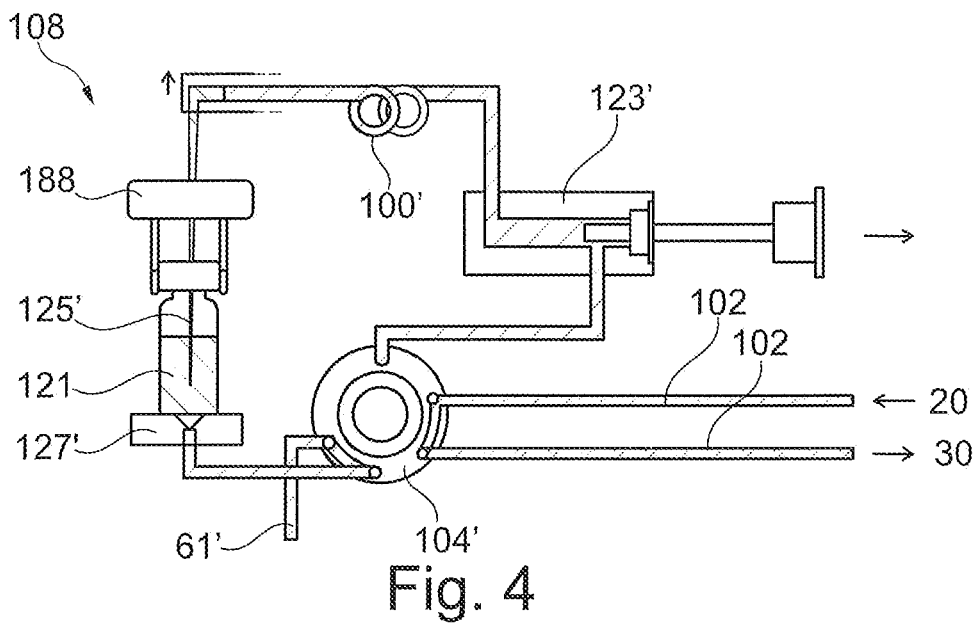
FIG. 4 illustrates a different operation state of the injector to be emulated illustrated in FIG. 3.

Referring to FIG. 4, in a first procedure during operating the injector to be emulated 108, the piston of the metering device 123' moves back (according to FIG. 4 to the right) precisely such that exactly the amount of sample needed is drawn up to the needle 125' and sample loop 100'. A gripper 188 may be used for this purpose. In this procedure, the injection valve 104' is in a bypass position, so the flow goes directly from the pump or fluid drive unit 20' to the column or separation unit 30'. After drawing up the sample, gripper 188 brings back vial or sample container 121 (containing the fluidic sample) to a tray (not shown).

Figure 5:
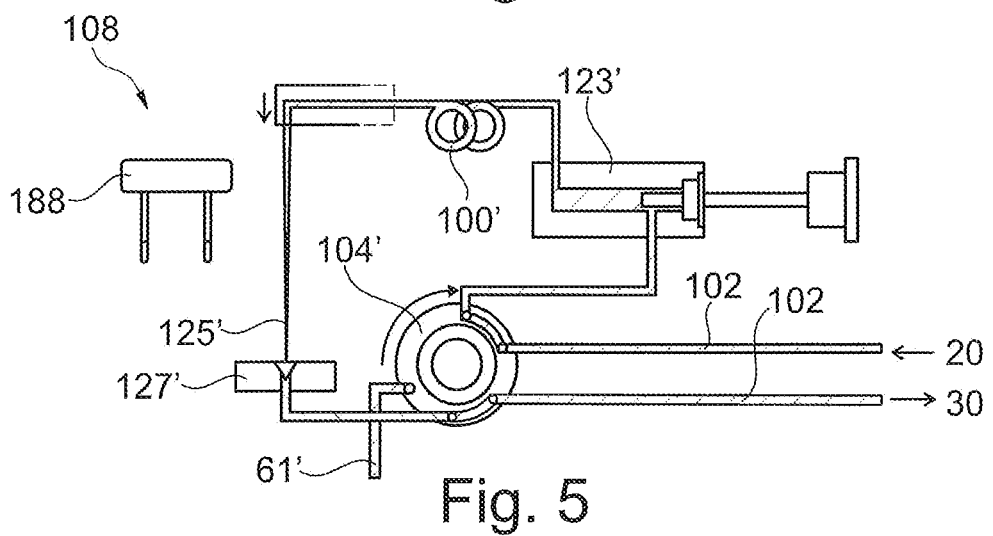
FIG. 5 illustrates another, different operation state of the injector to be emulated illustrated in FIG. 3.

Referring to FIG. 5, in a second procedure during operating the injector to be emulated 108, the needle 125' goes to the needle seat 127', where it fits tightly. The valve 104' is switched to a mainpass position. Now the flow goes from the pump or fluid drive unit 20' through the valve 104' and metering device 123'. It flushes the needle 125' and carries the sample with the solvent flow. An advantage of this flow-through design is that carry-over is reduced or even minimized as the autosampler may be flushed during the sample separation.

Figure 6:
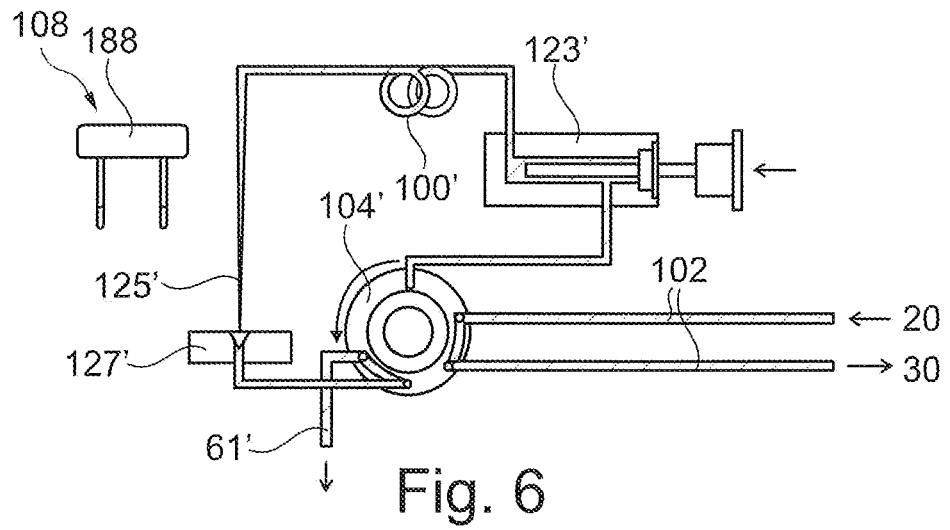
FIG. 6 illustrates another, different operation state of the injector to be emulated illustrated in FIG. 3.

Referring to FIG. 6, in a third procedure during operating the injector to be emulated 108, the autosampler is prepared for the next injection. The valve 104' switches back to bypass position and the metering device 123' moves to the front (according to FIG. 6 to the left). A small portion of solvent corresponding to the injection volume goes to the waste 61'.

The described functionality of the injector 108 referring to FIG. 3 to FIG. 6 can be parameterized for creating a set of parameters defining the injection profile. In other words, the injection profile of the injector 108 to be emulated according to FIG. 3 to FIG. 6 corresponds to (or comprises) all necessary data required for carrying out the injection method according to FIG. 3 to FIG. 6. A processor (such as control unit 70) of the configurable injector 40 according to FIG. 1 or FIG. 2 may then use this injection profile and may carry out calculations so as to adapt functionality and operation of the injector 40 so as to carry out an injection method in such a manner that an obtained chromatogram looks identical to the chromatogram as obtained when using the sample separation apparatus 10 according to FIG. 3 to FIG. 6 although captured with the sample separation apparatus 10 according to FIG. 1 or FIG. 2. In particular, operation of the injector 108 to be emulated can thereby be emulated by the configurable injector 40, when configured accordingly.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A method of injecting a fluidic sample into a separation path of a sample separation apparatus using a configurable injector comprising a sample accommodation volume for accommodating the fluidic sample to be injected into the separation path, and a valve arrangement fluidically coupled with the sample accommodation volume, the configurable injector configured for injecting the fluidic sample into the separation path in accordance with at least one characteristic of an injection profile of an injector to be emulated, the method comprising:
   transmitting input data comprising the at least one characteristic of the injection profile of the injector to be emulated to the configurable injector whereby the configurable injector receives the at least one characteristic of the injection profile of the injector to be emulated;
   configuring the configurable injector by controlling the valve arrangement so that the configurable injector operates in accordance with the at least one characteristic of the injection profile and thereby emulates the at least one characteristic of the injection profile of the injector to be emulated when the configurable injector injects the fluidic sample into the separation path of the sample separation apparatus; and
   injecting the fluidic sample into the separation path of a sample separation apparatus using the configurable injector emulating the at least one characteristic of the injection profile of the injector to be emulated.

2. The method according to claim 1, further comprising:
   controlling a metering device for driving the fluidic sample into and/or out of the sample accommodation volume so that the configurable injector injects the fluidic sample in the separation path of the sample separation apparatus in accordance with at least one characteristic of the injection profile and thereby emulates the injector to be emulated.

3. The method according to claim 1, further comprising controlling the configurable injector to selectively emulate the injector to be emulated operating either in accordance with a feed injection or in accordance with a sample loop injection, depending on the received input data.

4. The method according to claim 1, further comprising:
   comparing one or more characteristics of the configurable injector and characteristics of the injector to be emulated in accordance with at least one characteristic of the injection profile, wherein the one or more characteristics include at least one of an injector type, an internal volume, a_flow velocity, a leakage, a flow rate and a pressure profile; and
   adjusting an operation of the configurable injector so that the adjusted operation of the configurable injector is compliant with the at least one characteristic of the injection profile, wherein the adjusting the operation of the configurable injector includes at least one of adjusting (i) a configuration of the value arrangement, (ii) an operation of the metering device, (iii) an operation of a needle, (v) a seat, (vi) an operation of a robot operating the needle, and (v) an operation of a fluid drive unit.

5. The method according to claim 1, the method further comprising adjusting an operation of the configurable injector so that a separation result obtained when operating the sample separation apparatus with the configurable injector, is identical to a separation result obtained when operating the sample separation apparatus with the injector to be emulated, wherein such adjustment includes at least one of adjusting (i) a volume of the fluidic sample injected into the separation path, (ii) a velocity of the injected fluid, (iii) a pressure profile that occurs when the fluidic sample of the sample accommodation volume is introduced into the separation path, (iv) a pre-compression of the fluidic sample, (v) a fluid flow rate, (vi) a mobile phase composition, and (vii) a start of a gradient run.

6. The method according to claim 1, wherein the configuring the configurable injector further comprises switching the sample accommodation volume accommodating fluidic sample into the separation path in accordance with the at least one characteristic of the injection profile.

7. The method according to claim 1, wherein the configuring the configurable injector further comprises adjusting a pressure profile that occurs when the fluidic sample of the sample accommodation volume is introduced into the separation path such that changes in a flow rate occurring in an operation of the injector to be emulated is emulated by the configurable injector.

8. The method according to claim 1, wherein the injecting the fluidic sample in the separation path is performed without a pre-compression of the fluidic sample in the sample accommodation volume prior to the injecting the fluidic sample into the separation path.

9. The method according to claim 1, further comprising pre-compressing the fluidic sample in the sample accommodation volume prior to the injecting the fluidic sample into the separation path.

10. The method according to claim 1, wherein the configuring the configurable injector further comprises changing an operation of a chromatographic pump so that a gradient profile of a mobile phase is emulated in accordance with the injection profile.

11. The method according to claim 1, wherein the configuring the configurable injector further comprises diluting the fluidic sample with a diluent in accordance with the at least one characteristic of the injection profile.

12. The method according to claim 1, wherein the configuring the configurable injector further comprises adjusting a fluid flow prior to starting a separation run by the configured injector such that a total volume of the fluid flow matches an interior volume of a fluid in the injector to be emulated.

13. The method according to claim 1, wherein the configuring further comprises altering a feed speed of the fluidic sample into the separation path in accordance with the injection profile of the injector to be emulated.

14. The method according to claim 1, further comprising_compensating a leakage characteristic of the injector to be emulated by adjusting a volume of the fluidic sample.

15. The method according to claim 1, wherein the configuring the configurable injector further comprises altering a flow rate of the fluidic sample so that the gradient profile of a mobile phase is emulated in accordance with the injector to be emulated.

16. The method according to claim 1, wherein the configuring the configurable injector further comprises changing an operation of a metering device in accordance with the injection profile of the injector to be emulated.

17. The method according to claim 1, further comprising delaying a start of a gradient run in accordance with the characteristic of the injector profile of the injector to be emulated being a gradient delay characteristic.

* * * * *